United States Patent [19]
Silvian

[11] Patent Number: 5,979,906
[45] Date of Patent: Nov. 9, 1999

[54] MULTI-LAYERED METAL GASKET ASSEMBLY AND METHOD OF CONSTRUCTING THE SAME

[75] Inventor: Lucian Silvian, Troy, Mich.

[73] Assignee: Farnam/Meillor Sealing Systems Inc., Troy, Mich.

[21] Appl. No.: 08/800,259

[22] Filed: Feb. 13, 1997

[51] Int. Cl.[6] ..................................................... F02F 11/00
[52] U.S. Cl. ............................................ 277/593; 277/594
[58] Field of Search .................................. 277/591, 593, 277/594, 595

[56] References Cited

U.S. PATENT DOCUMENTS

| | | | |
|---|---|---|---|
| 4,834,399 | 5/1989 | Udagawa et al. | 277/234 |
| 4,852,893 | 8/1989 | Wesley | 277/1 |
| 5,054,793 | 10/1991 | Hauenstein et al. | 277/1 |
| 5,087,058 | 2/1992 | Miura et al. | 277/595 |
| 5,122,214 | 6/1992 | Zurfluh et al. | 156/220 |
| 5,150,910 | 9/1992 | Udagawa | 277/235 B |
| 5,161,809 | 11/1992 | Matsushita et al. | 277/235 B |
| 5,205,566 | 4/1993 | Ueta et al. | 277/180 |
| 5,277,434 | 1/1994 | Kestly et al. | 277/235 B |
| 5,362,074 | 11/1994 | Gallo et al. | 277/233 |
| 5,364,109 | 11/1994 | Sihon | 277/9 |
| 5,431,418 | 7/1995 | Hagiwara et al. | 277/235 B |
| 5,439,234 | 8/1995 | Udagawa | 277/235 B |
| 5,451,063 | 9/1995 | Udagawa et al. | 277/235 B |
| 5,516,124 | 5/1996 | Kubouchi et al. | 277/235 B |
| 5,586,769 | 12/1996 | Novil et al. | 277/1 |
| 5,609,345 | 3/1997 | Miura et al. | 277/180 |
| 5,713,580 | 2/1998 | Ueta . | |

*Primary Examiner*—Anthony Knight
*Assistant Examiner*—Alison K. Pickard
*Attorney, Agent, or Firm*—Benita J. Rohm; Raphael A. Monsanto

[57] ABSTRACT

A metal gasket assembly includes first and second gasket layers each having at least one sealing port defined therein. Each sealing port has an embossed bead formed about the periphery thereof which extends from a planar surface of the gasket layer. A stopper layer is disposed between the respective planar surfaces of the gasket layers and it has at least one bore extending therethrough which circumscribes the embossed beads. The stopper layer is of a sufficient thickness to prevent over-compression of the embossed beads during installation of the gasket assembly. A method is also disclosed for constructing a gasket assembly in accordance with a preferred embodiment of the subject invention.

22 Claims, 6 Drawing Sheets

MULTI-LAYERED METAL GASKET ASSEMBLY AND METHOD OF CONSTRUCTING THE SAME

BACKGROUND OF THE INVENTION

1. Field of the Invention

The subject invention is related to automotive gasket technology, and more particularly, to a multiple layered embossed metallic gasket assembly and a method of constructing the same.

2. Background of the Related Art

Metal gaskets are traditionally used to form a seal between two mating components of a mechanical system or device such as an internal combustion engine, to prevent leakage of combustion gases, cooling water, lubricating oil, or the like. Common applications involve placement of a gasket between the engine block and cylinder head, and between the cylinder head and exhaust manifold. Cylinder head gaskets typically extend around the cylinder bores of an engine to seal high pressure combustion gases within the cylinder bores, as well as seal oil and coolant passages. Exhaust manifold gaskets typically extend around the exhaust ports of an engine to seal high temperature exhaust gases flowing into the exhaust system. Once installed, the gasket bears the load from a bolted connection of the engine components and relies upon this load to provide an adequate seal therebetween.

To function as a reliable seal, it is known to provide a raised bead on a metal gasket in the area which surrounds a cylinder bore or exhaust port. The bead elastically deforms by tightening a bolt connection, and the elastic restoring force of the bead provides the required sealing effect. It is also known in the art to limit the compression of the raised bead by folding over a portion of the gasket adjacent the bead to function as a shim. In the absence of such a shim, when the gasket is tightened, the bead could be compressed beyond the elastic limits of the gasket material, resulting in an ineffective seal.

An example of a prior art metal gasket having specific structure to prevent over-compression of a resilient sealing bead is disclosed in U.S. Pat. No. 5,431,418 to Hagiwara et al. The gasket includes first and second opposed metal plates each having at least one opening with a surrounding bead. The plates are disposed in parallel such that the beads face each other, and an annular metallic shim is secured to the first plate adjacent the outer periphery of the bead, and is of a greater thickness than the bead, so that when a compressive load is applied to the gasket, both beads can only be deformed until their combined height equals the thickness of the shim. Hagiwara et al. disclose that the shim is welded by laser to the first plate around the opening to form a continues weld zone around the periphery of the shim. In the harsh environment of an internal combustion engine, wherein components are continuously subjected to high mechanical stresses, the weld zone could become an area of mechanical failure. In addition, the laser welding process will necessarily increase the overall manufacturing and labor cost associated with assembling the gasket.

SUMMARY OF THE INVENTION

The subject invention is directed to a unique multiple layered metallic gasket assembly, preferably configured for use as a seal between two components of an internal combustion engine, such as, for example, between an engine block and a cylinder head, between a cylinder head and an intake manifold, or between a cylinder head and an exhaust manifold. Other automotive gasket configurations are also envisioned and are within the scope of this invention, such as, for example, compressor gaskets, transmission gaskets, and the like.

In a preferred embodiment of the subject invention, the gasket assembly includes first and second active gasket layers each having at least one sealing port defined therein. An elastically deformable embossed bead is formed about the periphery of each sealing port and each bead extends from a respective planar surface of each gasket layer, and has a respective bead height. A stopper layer is disposed between the respective planar surfaces of the first and second gasket layers and it has at least one bore extending therethrough which circumscribes the embossed beads on the gasket layers. The stopper layer is substantially coextensive with the gasket layers and is of a sufficient thickness to prevent over-compression of the embossed beads during installation of the gasket assembly, i.e., when a load is applied to the gasket assembly.

In accordance with a preferred embodiment of the subject invention, the thickness of the stopper layer is selected in such a manner so that when the gasket assembly is in an uncompressed state prior to installation, the thickness of the stopper layer is equal to (100−X)/100 multiplied by the sum of the bead heights, for X percent allowable compression of the combined bead height. Preferably, the bead height of the embossed bead on the first gasket layer is equal to the bead height of the embossed bead on the second gasket layer. However, the bead height on the first gasket layer may differ from the bead height of the second gasket layer.

In accordance with the subject invention, the multi-layered gasket assembly may be constructed from a single gasket layer and an associated stopper layer, or from two sets of multi-layered gasket assemblies stacked upon one another and each having a respective stopper layer associated therewith to limit embossment compression. It is also contemplated that the embossments defined on each layer of the gasket assembly can be configured as full beads or half beads, and can take a variety of different geometric configurations including, for example, a rounded bead, a trapezoidal bead or a triangular bead.

The subject invention is also directed to unique method of constructing a gasket assembly which includes the steps of providing a first gasket layer having at least one sealing port defined therein which has an embossed bead formed about the periphery thereof, providing a second gasket layer having at least one sealing port defined therein which has an embossed bead formed about the periphery thereof, providing a stopper layer between the respective planar surfaces of the two gasket layers which has at least one bore extending therethrough that circumscribes the embossed beads, and selecting the thickness of the stopper layer in such a manner so as to prevent over-compression of the embossed beads during installation of the gasket assembly.

Further features of the multi-layered gasket assembly of the subject invention, and the method of constructing the gasket assembly will become more readily apparent to those having ordinary skill in the art from the following detailed description of the invention taken in conjunction with the drawings.

BRIEF DESCRIPTION OF THE DRAWINGS

So that those having ordinary skill in the art to which the subject invention appertains will more readily understand how to construct and use the gasket assembly of the subject invention, preferred embodiments thereof will be described in detail hereinbelow with reference to the drawings wherein.

DETAILED DESCRIPTION OF THE PREFERRED EMBODIMENTS

Figure 1:
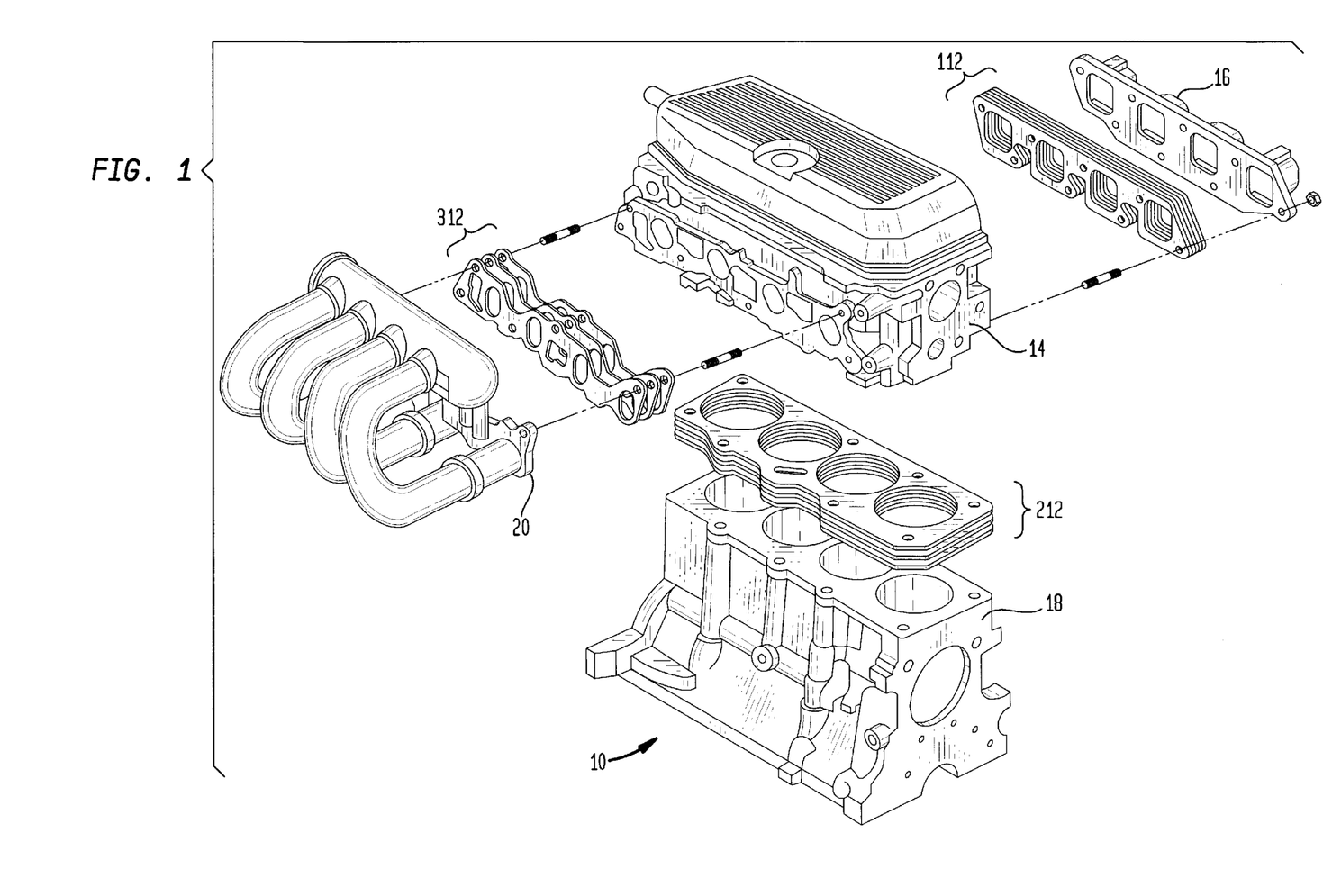
FIG. 1 is a perspective view of an internal combustion engine which employs a head gasket assembly constructed in accordance with a preferred embodiment of the subject invention, an intake manifold constructed in accordance with a preferred embodiment of the subject invention, and an exhaust manifold gasket assembly constructed in accordance with a preferred embodiment of the subject invention, the engine and the gasket assemblies being shown with parts separated for ease of illustration.

Referring now in detail to the drawings wherein like reference numerals identify similar structural elements of the subject invention, there is illustrated in FIG. 1, an internal combustion engine 10 which employs three different types of multi-layered metallic gasket assemblies constructed in accordance with a preferred embodiment of the subject invention. The first gasket assembly, which is generally referred to be reference numeral 112, is a multi-layered exhaust manifold gasket assembly which functions as a static seal between the cylinder head 14 and exhaust manifold 16 of engine 10. The second gasket assembly, which is generally referred to by reference numeral 212, is a multi-layered metallic cylinder head gasket assembly which functions as a static seal between the engine block 18 and the cylinder head 14 of engine 10. The third gasket assembly, which is generally referred to by reference numeral 312, is a multi-layered metallic intake manifold gasket assembly which functions as a static seal between the cylinder head 14 and the intake manifold 20 of engine 10.

It will become readily apparent to those having ordinary skill in the art, that a multi-layered gasket assembly constructed in accordance with a preferred embodiment of the subject invention may be employed on other parts of the engine as well, such as, for example, between the intake manifold and the throttle body. Gasket assemblies of this type may also be employed in other areas of the automobile, such as, for example, in the transmission or exhaust system, and in any other location in which it is necessary to prevent the leakage of combustion gases, cooling fluids or lubricating oil.

Figure 2:
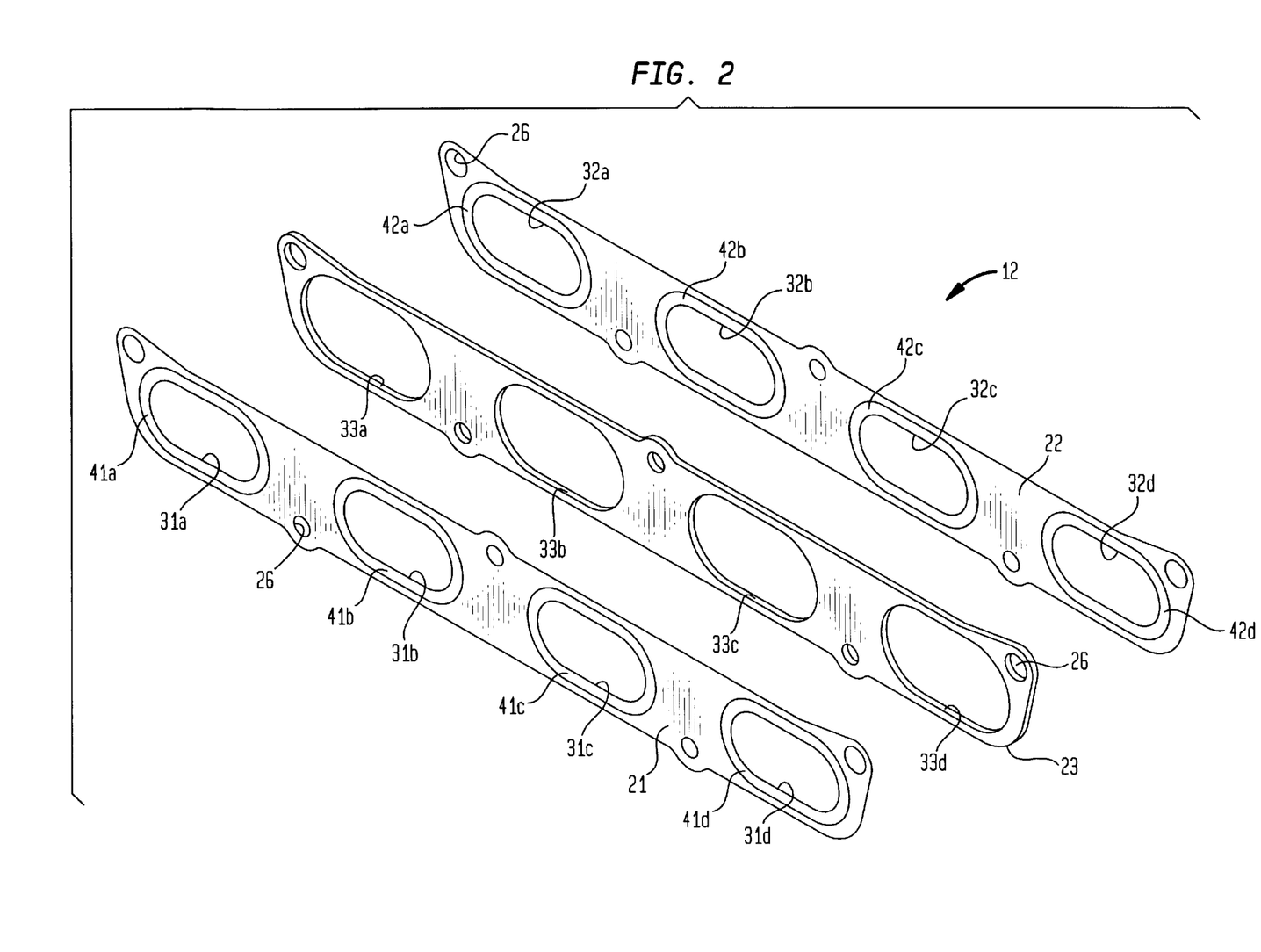
FIG. 2 is an exploded perspective view of a multi-layered exhaust manifold gasket assembly constructed in accordance with a preferred embodiment of the subject invention, with the parts thereof separated for ease of illustration.
Figure 3:
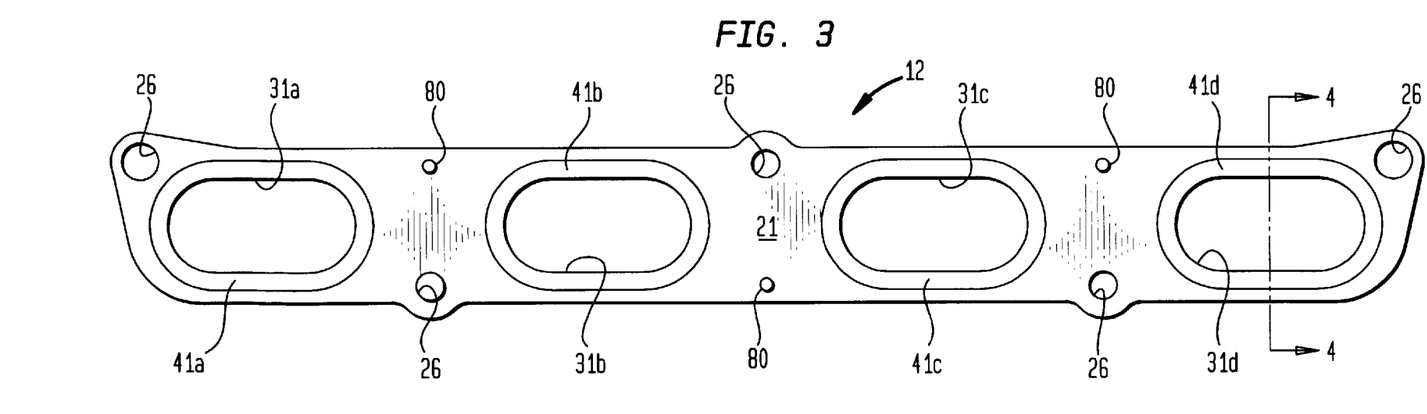
FIG. 3 is a top plan view of the multi-layered exhaust manifold gasket assembly illustrated in FIG. 2.

Referring to FIGS. 2 and 3, there is illustrated another exhaust manifold gasket assembly constructed in accordance with a preferred embodiment of the subject invention and designated generally by reference numeral 12. Manifold gasket assembly 12 has three stamp formed metal plates or layers, including a first upper active layer 21, a second lower active layer 22, and a third intermediate stopper layer 23 which acts as a shim between the two active layers. Each layer of gasket assembly 12 has four spaced apart generally oval apertures which would correspond to the geometry of the exhaust ports of the combustion engine with which it is employed, and a plurality of circular holes 26 which accommodate an equal number of bolts that secure the exhaust manifold to the engine's cylinder head, and supply the load which enables gasket assembly 12 to provide an effective seal.

Specifically, the upper active layer 21 includes spaced apart sealing ports 31a–31d, the lower active layer 22 has spaced apart sealing ports 32a–32d, and the intermediate stopper layer 23 has spaced apart expansion bores 33a–33d which are oversized as compared to the sealing ports. Those having ordinary skill in the art will readily appreciate that the number, size and configuration of the sealing ports and/or bores in each layer of gasket assembly 12 will depend upon the size, orientation, and/or configuration of the particular type of engine with which it is employed.

Figure 4:
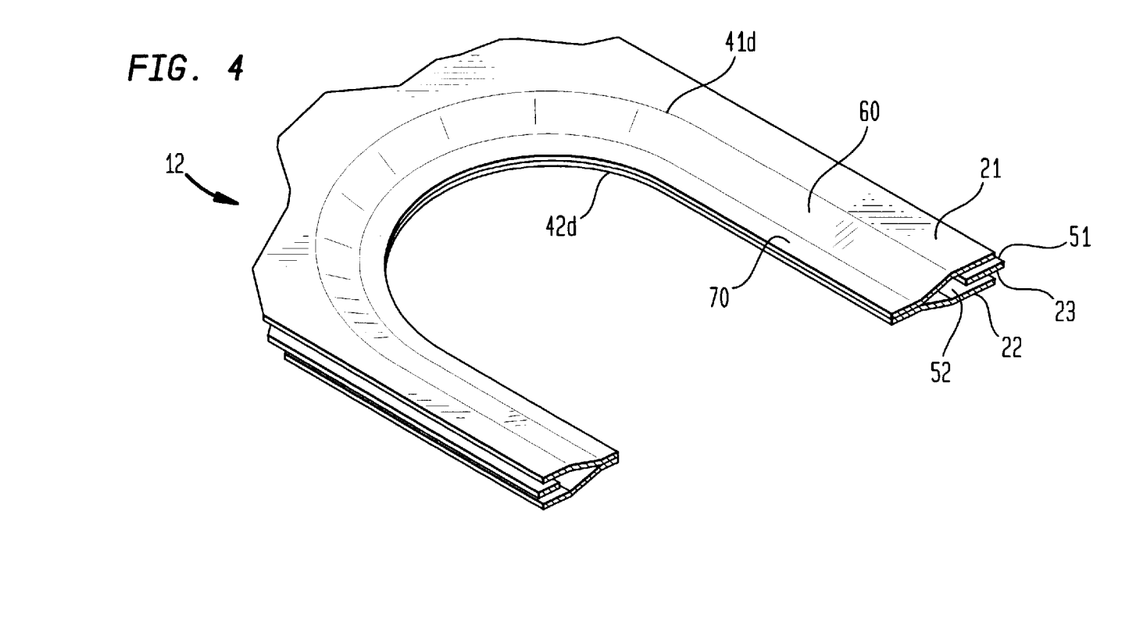
FIG. 4 is an enlarged perspective view of a portion of the exhaust manifold gasket assembly of FIG. 2 illustrating the embossed bead which surrounds the periphery of a sealing port in the active layers of the gasket assembly, with the assembly shown in an uncompressed condition.

An elastically deformable embossed bead extends about the periphery of each of the sealing ports formed in each of the active layers of the gasket assembly 12 to provide an effective seal between the cylinder head 14 and the exhaust manifold 16. More particularly, embossed beads 41a–41d extend about the peripheries of sealing ports 31a–31d, respectively, and embossed beads 42a–42d extend about the peripheries of sealing ports 32a–32d, respectively. As illustrated in FIG. 4, the embossed beads on the upper active layer 21 depend downwardly from planar surface 51 and the beads on the lower active layer 22 extend upwardly from the planar surface 52. Each of the embossed beads on the active layers of gasket assembly 12 includes a radially inwardly inclined portion 60 and a circumferential planar contact portion 70, and each has an equivalent bead height $H_b$ as designated in FIG. 5. The stopper layer 23 has a particular thickness T, and as will be discussed in greater detail hereinbelow, is selected in such a manner so as to limit the magnitude of compression of the embossed beads when a load is applied to the gasket assembly by bolts 28.

Figure 5:
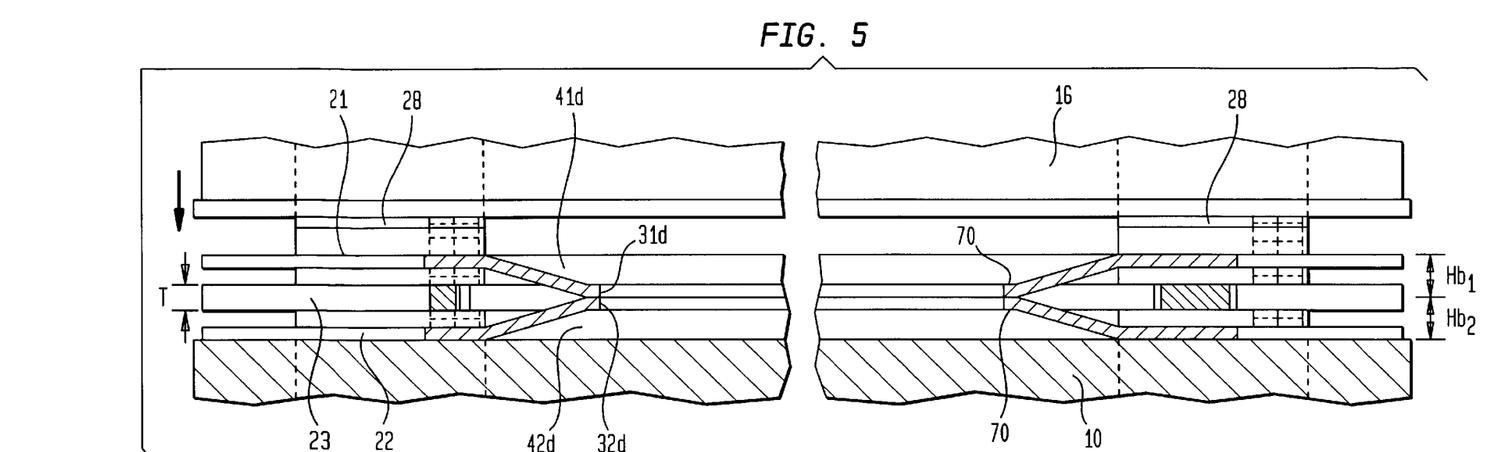
FIG. 5 is an enlarged cross-sectional view taken along line 4—4 of FIG. 3, illustrating the relative positions of the active layers of the exhaust manifold gasket assembly in an uncompressed state disposed between the exhaust manifold and the cylinder head.

Referring to FIG. 5, when the three layers are in an assembled condition, with the stopper layer 23 disposed between and slightly spaced from the respective planar surfaces 51 and 52 of active layers 21 and 22, the planar contact portions 70 of embossed beads 41a–41d are in face-to-face abutment with the planar contact portions 70 of embossed beads 42a–42d. In addition, the abutting beads are wholly circumscribed by the spaced apart expansion bores 33a–33d of stopper layer 23. It is envisioned that the three layers of gasket assembly 12 may be secured or fastened together by any number of means known in the art, such as, for example, spot welds. However, as illustrated in FIG. 3, a plurality of spaced apart rivets 80 are employed to secure the three layers of the gasket assembly to one another.

Figure 6:
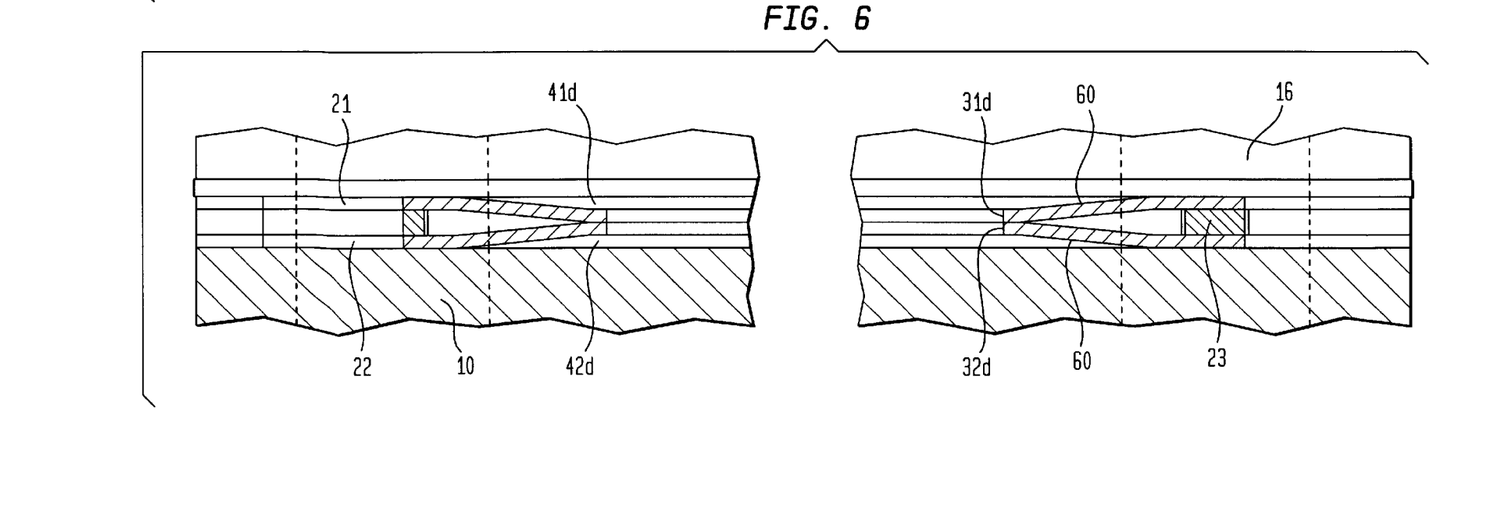
FIG. 6 is an enlarged cross-sectional view taken along line 4—4 of FIG. 3, illustrating the relative positions of the layers of the exhaust manifold gasket assembly in a compressed state disposed between the exhaust manifold and the cylinder head.

Referring to FIG. 6, when the gasket assembly 12 is installed between the cylinder head 14 and the exhaust manifold 16, and a load is applied thereto by bolts 28, the embossed beads of active layers 21 and 22 are compressed relative to the stopper layer 23. As the beads are compressed or deformed, the angle of the inclined portion 60 of each bead is substantially reduced. However, because stopper layer 23 is incompressible under the applied load of the bolts, the extent that the beads are compressed is effectively limited by the stopper layer. Accordingly, the embossed beads cannot be compressed beyond the elastic limits of the gasket material during installation. In addition, the spring characteristics of the embossments will be maintained and they will have an increased fatigue life, allowing repeated relaxation and compression of the gasket assembly.

The particular thickness of stopper layer 23 is selected based upon a desired amount of allowable compression of the gasket assembly. The amount of allowable compression is generally a function of the physical characteristics of the material from which the active layers of the gasket assembly are fabricated, as well as the thickness of the active layers and the angle of inclination of the embossed beads. Preferably, the material of construction of the active layers of the gasket assembly is either 301 or 304 stainless steel, the thickness of the active layers is about 0.25 mm (0.010 in.), and the angle of inclination of each embossed bead may be about between 10° and 20° relative to the planar contact portion thereof. The stopper layer 23 is preferably formed from a low carbon steel, and under certain circumstances, the active layers may also be formed from a low carbon steel. Referring to FIGS. 5 and 6, the selected thickness of the stopper layer can be expressed mathematically by the following equation:

$$T = ((100-X)/100))(Hb_1 + Hb_2)$$

Where: T is the thickness of the stopper layer;
$Hb_1$ is the height of the bead on the first active layer; and
$Hb_2$ is the height of the bead on the second active layer.
For: X % allowable compression of the gasket assembly.

By way of example, if the desired allowable compression of the gasket assembly under normal loading conditions is 50%, the selected thickness T of the stopper layer will be $((100-50)/100))(Hb_1 + Hb_2)$, which can be expressed alternatively as T=Hb. Thus, in this example, the selected thickness of the stopper layer would be equal to the bead height of either one of the active layers. Those having ordinary skill in the art will readily appreciate that for each gasket assembly constructed in accordance with a preferred embodiment of the subject invention, there will be a limit to the amount of compression that can be allowed to occur in the embossments, and thus it follows that there will be a corresponding minimum selectable stopper layer thickness. Conversely, there will also be a maximum selectable stopper layer thickness which would permit a minimum amount of embossment deflection.

Figure 7:
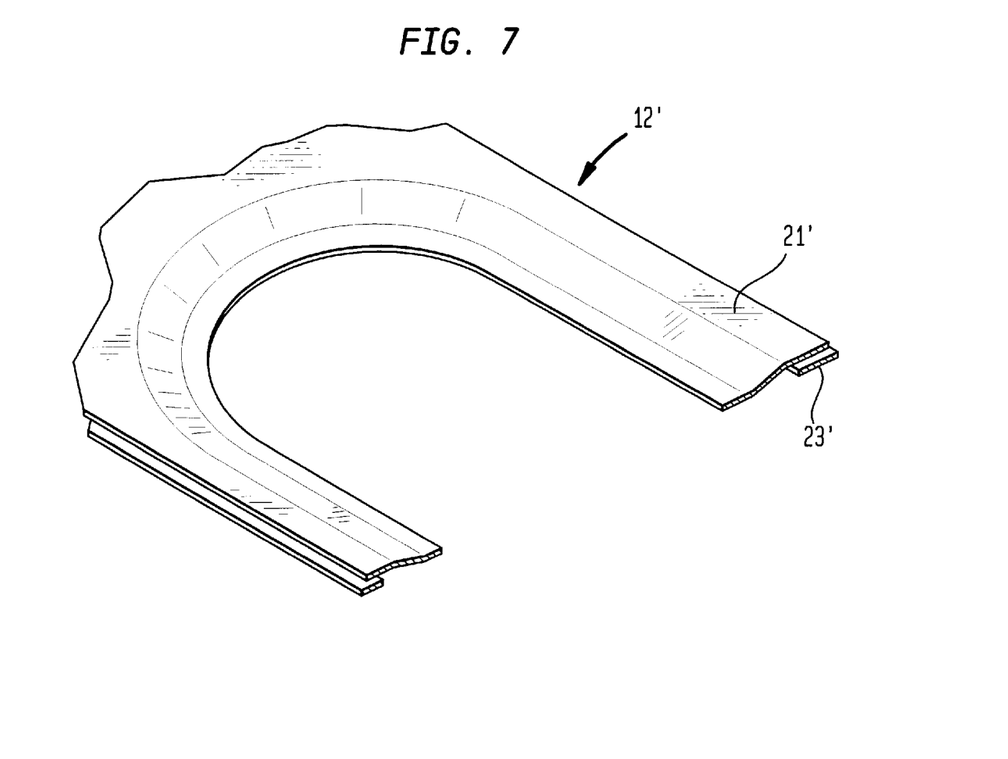
FIG. 7 is an enlarged perspective view of a portion of another exhaust manifold gasket assembly constructed in accordance with a preferred embodiment of the subject invention which includes a single embossed gasket layer in conjunction with a stopper layer.
Figure 8:
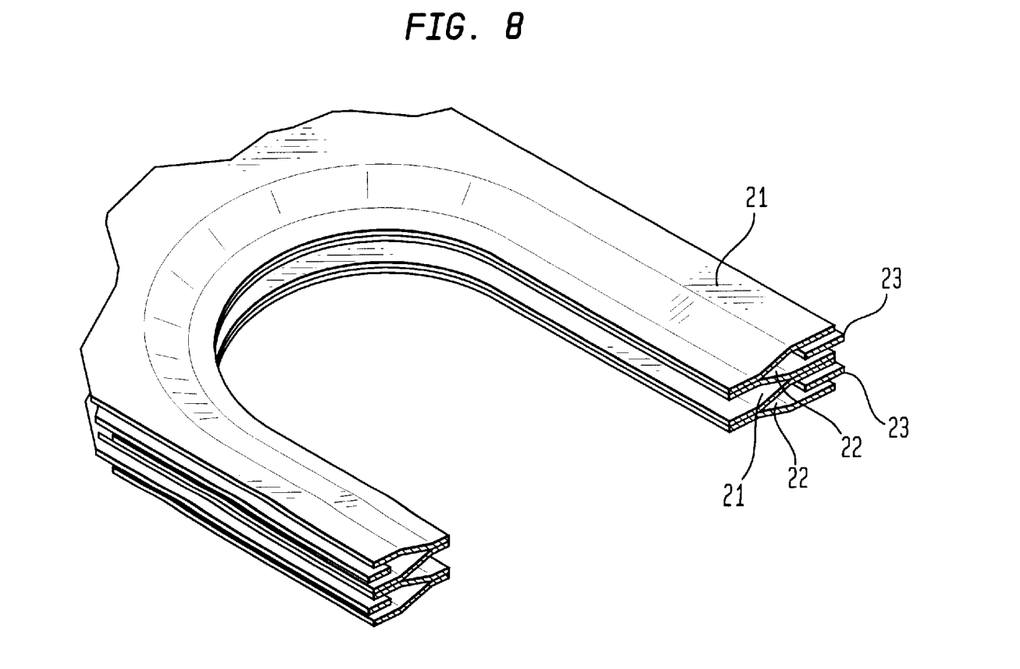
FIG. 8 is an enlarged perspective view of a portion of another exhaust manifold gasket assembly constructed in accordance with a preferred embodiment of the subject invention which includes two sets of multi-layered gaskets assemblies stacked upon one another, each having an independent stopper layer associated therewith.

Referring now to FIG. 7, there is illustrated an alternate embodiment of the exhaust manifold gasket assembly of the subject invention designated generally by reference numeral 12'. Gasket assembly 12' includes a single embossed active layer 21' and a stopper layer 23' for limiting compression of the embossments defined on active layer 21'. As illustrated in FIG. 8, two multi-layered gasket assemblies of the type illustrated in FIG. 4 and designated generally by reference numeral 12 may be stacked one upon another, each having a respective stopper layer 23 to prevent over compression of the embossments formed on the respective upper and lower active layers 21 and 22 thereof.

Figure 9:
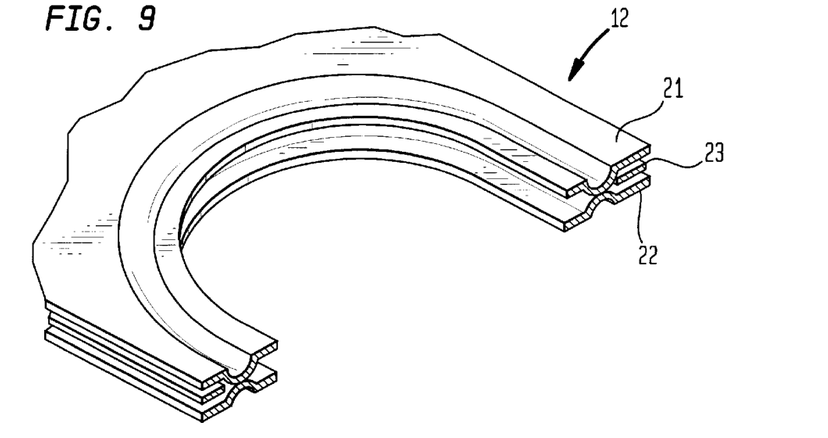
FIG. 9 is an enlarged perspective view of a portion of another exhaust manifold gasket assembly constructed in accordance with a preferred embodiment of the subject invention which includes a gasket layers having rounded embossments defined therein.
Figure 10:
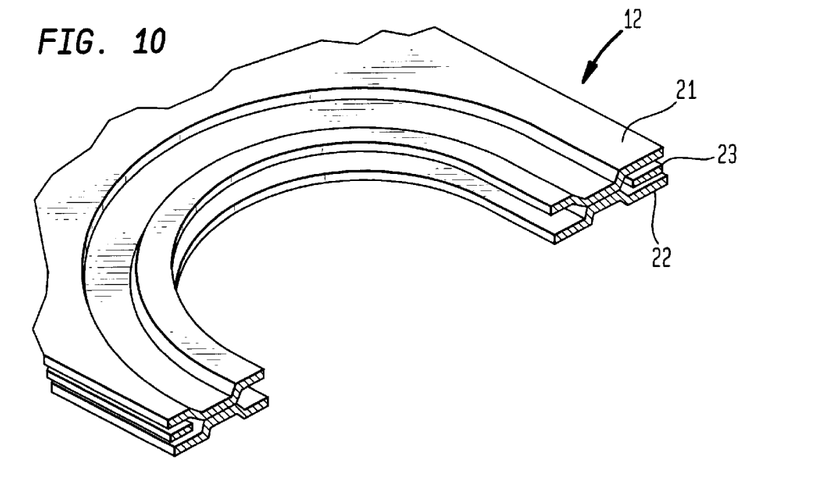
FIG. 10 is an enlarged perspective view of a portion of another exhaust manifold gasket assembly constructed in accordance with a preferred embodiment of the subject invention which includes gasket layers having trapezoidal embossments thereon.
Figure 11:
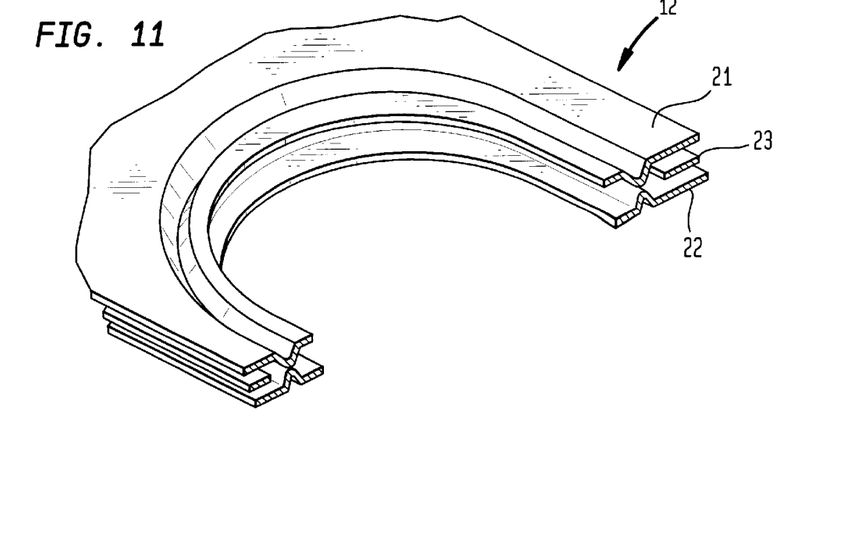
FIG. 11 is an enlarged perspective view of a portion of another exhaust manifold gasket assembly constructed in accordance with a preferred embodiment of the subject invention which includes gasket layers having triangular embossments thereon.

Those having ordinary skill in the art will readily appreciate that the embossed bead on each active layers of gasket assembly 12 can have geometric profiles other than the ramped half-bead profile illustrated in FIG. 4. For example, as illustrated in FIG. 9, the embossed bead on each active layer of gasket assembly 12 may have a substantially arcuate geometric profile. Alternatively, as illustrated in FIG. 10, the embossed bead on each active layer of gasket assembly 12 may have a substantially trapezoidal geometric profile. As illustrated in FIG. 11, the embossed bead on each active layer of the gasket assembly could also have a substantially triangular geometric profile. In either instance, regardless of geometric configuration, the embossed beads are elastically deformable and a stopper layer constructed in accordance with the subject invention, disposed between the active layers, will effectively prevent over compression of the embossed beads during installation. Consequently, the embossments will not buckle or crack under load, and the gasket assembly will provide an adequate seal over an extended period of time. In addition, the intermediate stopper layer will advantageously serve as a secondary sealing structure to reduce leakage between the active gasket layers, and as a support structure to reduce bending and distortion of mating flanges of the active gasket layers.

Although the multi-layer gasket assembly of the subject invention has been described with respect to a preferred embodiment, it will be readily apparent to those having ordinary skill in the art that modifications and changes can be made thereto without departing from the spirit and scope of the invention as defined by the appended claims.

What is claimed is:

1. A gasket assembly comprising:
    a) a gasket layer having a planar surface and at least one sealing port defined therein, said gasket layer having an embossed bead formed about the periphery of the sealing port in the planar surface of said gasket layer; and
    b) a stopper layer disposed adjacent said planar surface of said gasket layer, said stopper layer having at least one bore extending therethrough positioned and dimensioned to circumscribe the sealing port of said gasket layer radially outwardly of the embossed bead, said stopper layer having a thickness that is predetermined to prevent over-compression of the embossed bead during installation of the gasket assembly.

2. A gasket assembly comprising:
   a) a first gasket layer having a planar surface and at least one first gasket layer sealing port defined therein, said first gasket layer having an embossed bead formed about the periphery thereof in the planar surface of said first gasket layer, the embossed bead on said first gasket layer having a first respective bead height;
   b) a second gasket layer having a planar surface and at least one second gasket layer sealing port defined therein, the second gasket layer sealing port being positioned in registration with the first gasket layer sealing port and arranged to have an embossed bead formed about the periphery thereof in the planar surface of said second gasket layer, the embossed bead on said second gasket layer having a second respective bead height; and
   c) a stopper layer disposed between the respective planar surfaces of said first and second gasket layers and having at least one bore extending therethrough positioned and dimensioned to circumscribe the sealing port of said first and second gasket layers radially outwardly of the respective embossed beads, said stopper layer having a thickness that is predetermined to prevent over-compression of the embossed beads during installation of the gasket assembly.

3. A gasket assembly as recited in claim 2, wherein said stopper layer is substantially coextensive with said first and second gasket layers.

4. A gasket assembly as recited in claim 2, wherein the thickness of said stopper layer is selected such that when the gasket assembly is in an uncompressed state prior to installation, the thickness of said stopper layer is equal to $(100-X)/100$ multiplied by the sum of the bead heights, for X percent allowable compression of the combined bead height.

5. A gasket assembly as recited in claim 4, wherein the bead height of the embossed bead on said first gasket layer is equal to the bead height of the embossed bead on said second gasket layer.

6. A gasket assembly as recited in claim 2, wherein each embossed bead has a radially outer inclined surface and a radially inner planar contact surface.

7. A gasket assembly as recited in claim 6, wherein the planar contact surface of the embossed bead on said first gasket layer is in face-to-face contact with the planar contact surface of the embossed bead on said second gasket layer.

8. A gasket assembly as recited in claim 2, wherein each embossed bead has a substantially arcuate profile.

9. A gasket assembly as recited in claim 2, wherein each embossed bead has a substantially trapezoidal profile.

10. A gasket assembly as recited in claim 2, wherein each embossed bead has a substantially triangular profile.

11. A gasket assembly as recited in claim 2, wherein the first and second gasket layers are formed from a first metallic material and the stopper layer is formed from a second metallic material.

12. A gasket assembly as recited in claim 2, wherein each layer of the gasket assembly includes a plurality of spaced apart bolt holes.

13. A gasket assembly as recited in claim 2, wherein the gasket assembly is configured for use as an automotive exhaust manifold gasket.

14. A gasket assembly as recited in claim 2, wherein the gasket assembly is configured for use as an automotive intake manifold gasket.

15. A gasket assembly as recited in claim 2, wherein the gasket assembly is configured for use as an automotive cylinder head gasket.

16. A gasket assembly comprising:
   a) a first layer having at least one sealing port defined therein, the sealing port having an embossed bead formed about the periphery thereof which extends from a planar surface of said first gasket layer;
   b) a second gasket layer having at least one sealing port defined therein, the sealing port having an embossed bead formed about the periphery thereof which extends from a planar surface of said second gasket layer; and
   c) a stopper layer disposed between the respective planar surfaces of said first and second gasket layers and having at least one bore extending therethrough that radially outwardly circumscribes the embossed beads, said stopper layer having a thickness selected to limit the magnitude of compression of the embossed beads during installation of the gasket assembly.

17. A gasket assembly as recited in claim 16, wherein said stopper layer is substantially coextensive with said first and second gasket layers.

18. A gasket assembly as recited in claim 16, wherein the embossed bead on said first gasket layer has a first bead height and the embossed bead on said second gasket layer has a second bead height.

19. A gasket assembly as recited in claim 18, wherein the thickness of said stopper layer is selected such that, when the gasket assembly is in an uncompressed state prior to installation, the thickness of said stopper layer is equal to $(100-X)/100$ multiplied by the sum of the bead heights, for X percent allowable compression of the combined bead height.

20. A gasket assembly as recited in claim 16, wherein each embossed bead has a radially outer inclined surface and a radially inner planar contact surface, and wherein the planar contact surface of the embossed bead on said first gasket layer is in face-to-face contact with the planar contact surface of the embossed bead on said second gasket layer.

21. A gasket assembly as recited in claim 16, wherein the first and second gasket layers and the stopper layer are formed of metallic materials.

22. A method of constructing a gasket assembly:
   a) providing a first gasket layer having at least one sealing port defined therein, the at least one sealing port having a first gasket layer embossed bead formed about the periphery thereof extending from a planar surface of said first gasket layer;
   b) providing a second gasket layer having at least one sealing port defined therein, the at least one sealing port having a second gasket layer embossed bead formed about the periphery thereof extending from a planar surface of said second gasket layer;
   c) providing a stopper layer between the respective planar surfaces of said first and second gasket layers having at least one bore extending therethrough that is configured and dimensioned to circumscribe radially outwardly the first and second gasket layer embossed beads; and
   d) selecting a thickness dimension of said stopper layer to prevent over-compression of said embossed beads during installation of the gasket assembly.

* * * * *